Figure 1:
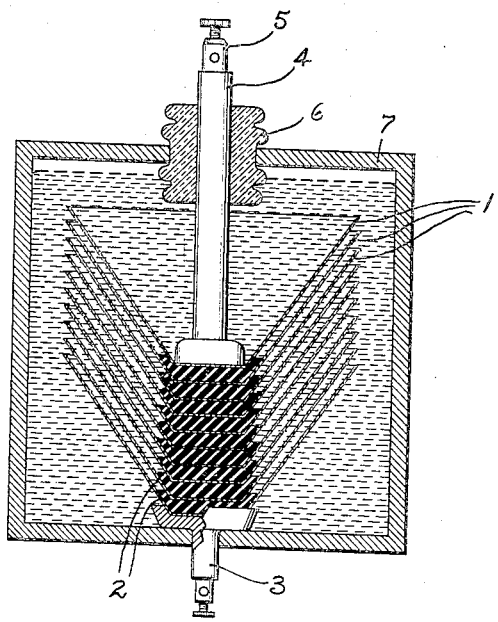

E. E. F. CREIGHTON.
ELECTROLYTIC CELL OR CONDENSER.
APPLICATION FILED SEPT. 18, 1907.

923,774.

Patented June 1, 1909.

Witnesses:
Marcus L. Byng.
Lester H. Fulmer

Inventor:
Elmer E. F. Creighton,
by Albert G. Davis
Att'y.

UNITED STATES PATENT OFFICE.

ELMER E. F. CREIGHTON, OF SCHENECTADY, NEW YORK, ASSIGNOR, BY MESNE ASSIGNMENTS, TO GENERAL ELECTRIC COMPANY, A CORPORATION OF NEW YORK.

ELECTROLYTIC CELL OR CONDENSER.

No. 923,774.　　　Specification of Letters Patent.　　　Patented June 1, 1909.

Original application filed July 9, 1906, Serial No. 325,195. Divided and this application filed September 18, 1907. Serial No. 393,511.

*To all whom it may concern:*

Be it known that I, ELMER E. F. CREIGHTON, a citizen of the United States, residing at Schenectady, county of Schenectady, State of New York, have invented certain new and useful Improvements in Electrolytic Cells or Condensers, of which the following is a specification.

My present application is a division of an application filed by me July 9, 1906, Serial No. 325,195, lightning arrester, and relates particularly to an electrolytic cell or condenser.

The novel features of my invention are particularly pointed out in the appended claims, for a better understanding of which reference may be had to the following description taken in connection with the drawing forming a part of this specification.

Figure 2:
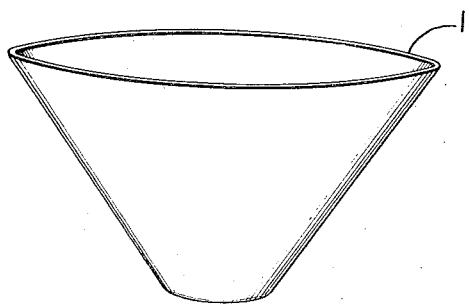
Figure 3:

Figure 1 is a sectional elevation of an electrolytic condenser; Fig. 2 is a perspective view of one of the conical cups forming a part thereof; and Fig. 3 is a perspective view of an insulator used for separating two adjacent cups.

The electrolytic apparatus illustrated in Fig. 1 comprises a plurality of conical aluminum dishes 1 nested one within another and separated by porcelain or other insulators 2. These inulators are of cup shape, as shown in Fig. 3, and serve not only to electrically separate the plates but also serves to keep the dishes in position one above another. A conducting rod 3 connects with the lower plate and serves as a means for connecting the conductors to ground or to any suitable part of the distribution system. A conducting rod 4 rests on and makes contact with the upper dish or cup and is provided with a binding-post 5 for convenience in connecting the apparatus in circuit. A porcelain insulator 6 separates and insulates rod 4 from the inclosing metal box 7 within which the dishes are mounted. A suitable electrolyte is introduced between each pair of dishes so that the column as a whole comprises a series of aluminum plates separated by electrolyte. As an electrolyte I use a solution of citric acid for I find that this solution gives the apparatus a high capacity as a condenser and gives the aluminum plates a high break-down resistance. The inclosing box may be filled with oil or other insulating fluid of high thermal conductivity to prevent arcing along the edges of the aluminum dishes and to act as a cooling medium which absorbs heat from the plates and maintains all parts of the device at substantially the same temperature. The condenser action of the aluminum electrolytic condenser is usually attributed to the formation of a thin film of aluminum oxid or hydroxid on the aluminum plate because of the oxidizing action of the electrolyte when the aluminum plate is positive with respect to the electrolyte. This film is of extreme thinness and seems to be partially absorbed or eaten away from the plate when the condenser is inactive, though possibly it still remains and its apparent absence is due to the soaking up of the electrolyte by the film. At any rate the film does not appear to be present when current first flows between the plates but is developed after the expenditure of considerable electrical energy and thereafter offers a high resistance to the flow of current from the aluminum plate. With an electrolyte of citric acid the pressure between plates may be as high as 420 volts before the film breaks down and permits an appreciable current to flow between the plates.

If an alternating pressure is applied to the terminals 3 and 5, the apparatus operates as a true condenser and permits a certain quantity of current to pass to and from the terminals, the current being to a certain extent dependent on the frequency of the source.

Although the insulating coating on the aluminum plates possesses a very high disruptive strength it is nevertheless of extreme thinness. As the capacity of the condenser is to a certain extent dependent on the thinness of the dielectric, an aluminum condenser possesses marked advantages over condensers of the ordinary type having a dielectric of mica or glass. Not only is the storage capacity of the aluminum condenser very high in proportion to its size and weight, but it also possesses certain other characteristics entirely lacking in condensers of the ordinary type. Among these characteristics is the relation between the inductive capacity and the duration of the charging current. The capacity of the aluminum condenser is to a certain extent dependent on the time during which it has been in operation. When the condenser is first thrown in circuit the leakage through the condenser is considerably higher than that found after the condenser has been in operation for some little time. This phenomenon is probably due to the formation of the oxid or hydroxid coating by the oxidizing action of the leakage current, but whatever may be the principle underlying this phenomenon I find this characteristic of the aluminum condenser of great value for certain special classes of work. When the condenser is first thrown in circuit its low resistance, or high leakage, permits a relatively large quantity of energy to pass during the first instant of operation, and then by oxidation, interposes sufficient resistance to prevent excessive current of normal voltage from flowing. The exact time interval which is necessary to allow the condenser to rise from the condition of high leakage to that of low leakage is difficult to determine, but in some instances, I have found it to be less than 1/260 of a second with plates which had previously been subjected to the oxidizing action of current. Plates which have not thus been treated require a considerably longer time to build up to their maximum insulating capacity, such a long time in fact, that I consider it desirable in constructing the apparatus shown in Fig. 1 to subject the plates to a prolonged treatment with current to oxidize or otherwise "form" the plates.

I am aware that it has heretofore been proposed to "form" condenser plates by making them anodes in an oxidizing solution and permitting direct current to pass for some time, but I find that such treatment is not altogether satisfactory, probably because of impurities in the aluminum which are not removed from the surface of the plate by the direct current and which are present on the surface of the finished plate as small specks or irregularities. I find that this difficulty can be largely overcome by "forming" the plates with alternating current instead of direct current; possibly because of the scouring action which alternating current exerts on the surface of the aluminum plate.

After the films have once been formed and the apparatus has been assembled ready for use, the electrolyte seems to act in some way on the film and weaken or break it down in places. This phenomenon may be due to the corrosive action of the electrolyte; though possibly the acid is held as a mechanical mixture in the film, or between the particles of the aluminum oxid and is decomposed or forced out by the first rush of current, thus reëstablishing the high resistance film. This reëstablishment takes place so quickly that no detrimental quantity of line-current can discharge through the condenser.

The electrolytic condenser above described may be used for the protection of electrical systems from lighting and other abnormal conditions, as described more in detail in my parent application. It is also capable of various other applications as will be apparent to persons skilled in the art.

What I claim as new and desire to secure by Letters Patent of the United States, is,—

1. An electrolytic condenser comprising a plurality of oxidizable cups separated by an electrolyte containing citric acid.

2. An electrolytic condenser comprising a and plurality of aluminum cups spaced apart contacting with a citric acid solution.

3. An electrolytic condenser comprising a plurality of watertight aluminum cups arranged one within another, an electrolyte between said cups, and a body of insulating oil surrounding said cups.

4. An electrical condenser comprising a plurality of cup-shaped conductors arranged one within another and separated by a conductive solution, and an oil bath for insulating the edges of said cups.

5. In an electrolytic condenser, the combination of a plurality of frusto-conical aluminum electrodes, and insulating cups separating said electrodes and leaving a free passage for the escape of gases.

6. In an electrolytic condenser, the combination of a plurality of frusto-conical aluminum cups arranged one above another, insulating cups separating said aluminum cups, an electrolyte between each pair of aluminum cups, and a fluid insulator inclosing said cups and electrolyte.

7. In an electrolytic condenser, the combination of a containing envelop, a plurality of insulated plates therein, and means for supporting said plates at their center only.

8. In an electrolytic condenser, the combination of a containing envelop, a plurality of fluid-containing plates nested therein, and insulating means for supporting said plates at their centers out of contact with the walls of said containers.

9. In an electrolytic condenser, the combination of a container, a plurality of insulated nested electrode plates therein and supports extending from the walls of said container and engaging with each of the end plates.

10. In an electrolytic condenser, an electrolyte containing citric acid.

11. An electrolytic condenser comprising a plurality of nested aluminum plates, an electrolyte between said plates, and a body of oil insulating their edges.

12. In an electrolytic condenser, the combination of an inclosing box, nested aluminum plates within said box, an electrolyte between adjacent plates, and a liquid of high thermal conductivity separating said plates and electrolytes from the walls of said box.

In witness whereof, I have hereunto set my hand this 16th day of September, 1907.

ELMER E. F. CREIGHTON.

Witnesses:
BENJAMIN B. HULL,
MARGARET E. WOOLLEY.